United States Patent [19]

Nomura et al.

[11] Patent Number: 6,010,647
[45] Date of Patent: Jan. 4, 2000

[54] MULTIFOCAL LENS AND METHOD OF MAKING THE SAME

[75] Inventors: Yoshimitsu Nomura; Masaaki Fukuda; Takashi Ito; Kaneyoshi Yagi, all of Saitama, Japan

[73] Assignee: Fuji Photo Optical Co., Ltd., Saitama, Japan

[21] Appl. No.: 09/086,621

[22] Filed: May 29, 1998

[30] Foreign Application Priority Data

Jun. 30, 1997 [JP] Japan ..................... 9-174241

[51] Int. Cl.[7] .............. B29D 11/00; G02C 7/02
[52] U.S. Cl. .................. 264/1.8; 351/177
[58] Field of Search ................... 359/721, 719, 359/642; 351/168, 177, 161; 264/1.8, 1.7, 2.4

[56] References Cited

U.S. PATENT DOCUMENTS

| | | | |
|---|---|---|---|
| 4,710,327 | 12/1987 | Neefe | 264/1.7 |
| 4,759,762 | 7/1988 | Grendahl | 351/161 |
| 4,795,462 | 1/1989 | Grendahl | 351/161 |
| 5,002,382 | 3/1991 | Seidner | 351/161 |
| 5,152,787 | 10/1992 | Hamblen | 351/161 |
| 5,433,898 | 7/1995 | Thakrar et al. | 264/1.7 |

FOREIGN PATENT DOCUMENTS 8315402  11/1996  Japan.

*Primary Examiner*—Georgia Epps
*Assistant Examiner*—Jordan M. Schwartz
*Attorney, Agent, or Firm*—Leydig, Voit & Mayer, Ltd.

[57] ABSTRACT

A multifocal lens having a plurality of focal points with focal positions different from each other includes a central optical portion, centered at an optical axis, having a predetermined refractive index. The lens further includes at least one outer optical portion which is an optical member disposed like a ring around an outer periphery of the central optical portion so as to be centered at the optical axis, each having a different refractive index different from the predetermined refractive index and having an optical surface continuous with an optical surface of another optical portion disposed on the center side.

2 Claims, 5 Drawing Sheets

MULTIFOCAL LENS AND METHOD OF MAKING THE SAME

BACKGROUND OF THE INVENTION

1. Field of the Invention

The present invention relates to an optical multifocal lens having at least two focal points and a method of making the same.

2. Related Background Art

Conventionally known as an optical lens having a plurality of focal points are those shown in FIGS. 5 and 6. In the lens A shown in FIG. 5, a part of one optical surface B is provided with an area having a different curvature. A mold conforming to such an optical surface is employed to integrally mold and make the lens A by glass molding. In the lens D shown in FIG. 6, on the other hand, a UV-curing plastic or the like is attached to one optical surface F of a normal lens E so as to form a surface G having a different curvature. Since a part of the optical surface is provided with an area having a different curvature (C, G), the lenses A and D each function as a bifocal lens which is capable of converging transmitted light at two different points on its optical axis.

Also known is an example employing a Fresnel lens such as that disclosed in Japanese Patent Application Laid-Open No. 8-315402. As shown in FIG. 7, this lens H is formed by a combination of concentric annular bands constituting a longer-focus Fresnel lens I and a shorter-focus Fresnel lens J. As a consequence, light can be converged at two points, i.e., a shorter focal point K and a longer focal point L.

SUMMARY OF THE INVENTION

The above-mentioned conventional lenses A and D, however, have the following problems. In the lens A of FIG. 5, since the optical surface B includes an area with a different curvature, it requires a special mold for its manufacture, thus increasing the cost. In the lens D of FIG. 6, on the other hand, it is difficult to align the optical axes of the normal lens E and the area G having a different curvature, whereby a desired optical performance may not be accurately obtained. Further, grinding the lenses A and D is quite difficult since their optical surfaces B and F respectively include the surfaces C and G having a different curvature. Also, in the case where, in order to attain a high optical characteristic in the optical surfaces B and F and the surfaces C and G protruded therefrom, it is necessary for the surfaces C and G and the other surfaces to be ground separately from each other, such a grinding process would be quite complicated.

In the lens of FIG. 7, on the other hand, when the optical surface of an annular band constituting the Fresnel lens H shifts, not only its optical axis shifts but also the focal position varies among the annular bands. Consequently, it is difficult to form a multifocal lens having a plurality of desired focal positions, thereby incurring a high manufacturing cost.

In order to overcome the foregoing problems, it is an object of the present invention to provide a multifocal lens which is easy to manufacture and in which a desired optical characteristic can be easily obtained, and a method of making the multifocal lens.

In order to achieve such an object, the multifocal lens in accordance with the present invention comprises a central optical portion, centered at an optical axis, having a predetermined refractive index; and at least one outer optical portion which is an optical member disposed like a ring around an outer periphery of the central optical portion so as to be centered at the optical axis, each having a different refractive index different from the predetermined refractive index and having an optical surface continuous with an optical surface of another optical portion disposed on the center side.

As a consequence of such a configuration, a lens in which optical members having different refractive indices are concentrically disposed from the center part is obtained. Accordingly, rays transmitted through the respective portions of the lens can form images at different focal positions, whereby the lens can function as a multifocal lens. This lens can be ground in a manner similar to normal lenses, thus making it easy to process.

The method of making a multifocal lens in accordance with the present invention comprises disposing at a center of a mold having a predetermined form a monofocal or multifocal lens having an outer edge at a predetermined radial position from an optical axis; and injecting into the mold a material for an optical member having a refractive index different from that of the lens and solidifying the material so as to form an optical portion like a ring around an outer edge portion of the lens centered at the optical axis of the lens. Alternatively, the method may comprise disposing within a mold having a predetermined form a monofocal or multifocal lens having a penetrating opening at a center along an optical axis thereof; and injecting into the mold a material for an optical member having a refractive index different from that of the lens and solidifying the material so as to form a circular optical portion within the opening.

By either method, the above-mentioned multifocal lens in accordance with the present invention can be obtained easily.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
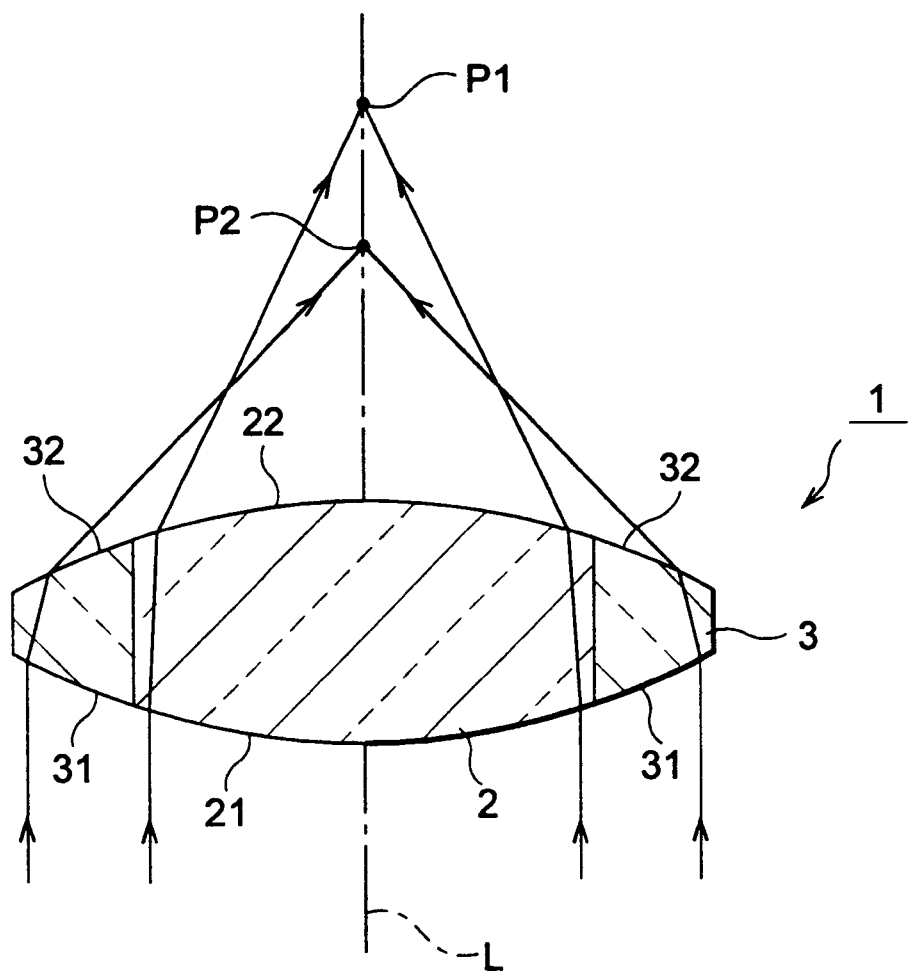
FIG. 1 is a schematic sectional view of a first preferred embodiment of the multifocal lens in accordance with the present invention.

In the following, various embodiments of the present invention will be explained. Among the drawings, constituents identical to each other will be referred to with numerals or letters identical to each other without their explanations being repeated. Also, the ratios of sizes in the drawings do not always correspond to those explained.

First Embodiment

FIG. 1 is an explanatory view of a multifocal lens in accordance with this embodiment.

As shown in FIG. 1, this multifocal lens 1, which is an optical lens having a plurality of focal points respectively having different focal lengths, is constituted by a central optical portion 2 disposed at its center part and an outer optical portion 3 surrounding the outer periphery of the central optical portion 2.

The central optical portion 2 includes an optical axis L and is disposed at the center part of the multifocal lens 1. The central optical portion 2 has a circularly formed outer edge, for example, and comprises optical surfaces 21 and 22 opposing each other, thereby yielding an optical function. Each of the optical surfaces 21 and 22 is formed with a predetermined curvature into a spherical or aspherical surface. The central portion 2 is formed by a material having a predetermined refractive index, e.g., glass.

The outer optical portion 3 is disposed concentrically with the central optical portion 2 at the outer periphery thereof, e.g., in a ring form. The outer optical portion 3 has optical surfaces 31 and 32 facing in opposite directions, thereby yielding an optical function. Optical surface 31 is a surface continuous with optical surface 21 of the central optical portion 2. Namely, optical surface 31 is a surface smoothly continuing to optical surface 21, thus yielding a form which can be ground together with optical surface 21 in a grinding step. On the other hand, optical surface 32 is a surface continuous with optical surface 22 of the central optical portion 2. Namely, optical surface 32 is a surface smoothly continuing to optical surface 22, thus yielding a form which can be ground together with optical surface 22 in a grinding step.

The outer optical portion 3 is formed by a material having a refractive index different from that of the central optical portion 2, e.g., plastic. For example, in the case where the refractive index of the outer optical portion 3 is higher than that of the central optical portion 2, when parallel rays are made incident on the optical surfaces 21 and 31 of the multifocal lens 1, those incident on the optical surface 21 and transmitted through the central optical portion 2 so as to be emitted from optical surface 22 are converged at a position P1 which is far from the multifocal lens 1 as shown in FIG. 1. By contrast, of the parallel rays, those incident on optical surface 31 transmitted through the outer optical portion 3 so as to be emitted from optical surface 32 are converged at a position P2 which is nearer to the multifocal lens 1 than is the position P1. Thus, when the central optical portion 2 and the outer optical portion 3 are made with refractive indices different from each other, the same light can be converged at positions different from each other. In this case, the light incident on the multifocal lens 1 is not limited to parallel rays. Namely, nonparallel rays can yield similar effects as well.

Further, as the refractive index of the central optical portion 2 or outer optical portion 3 is appropriately altered, without changing the form of the multifocal lens 1, those having different focal positions P1 and P2 can be made easily.

The making of the multifocal lens 1 will now be explained. First, a mold assembly will be explained with reference to FIG. 2.

Figure 2:
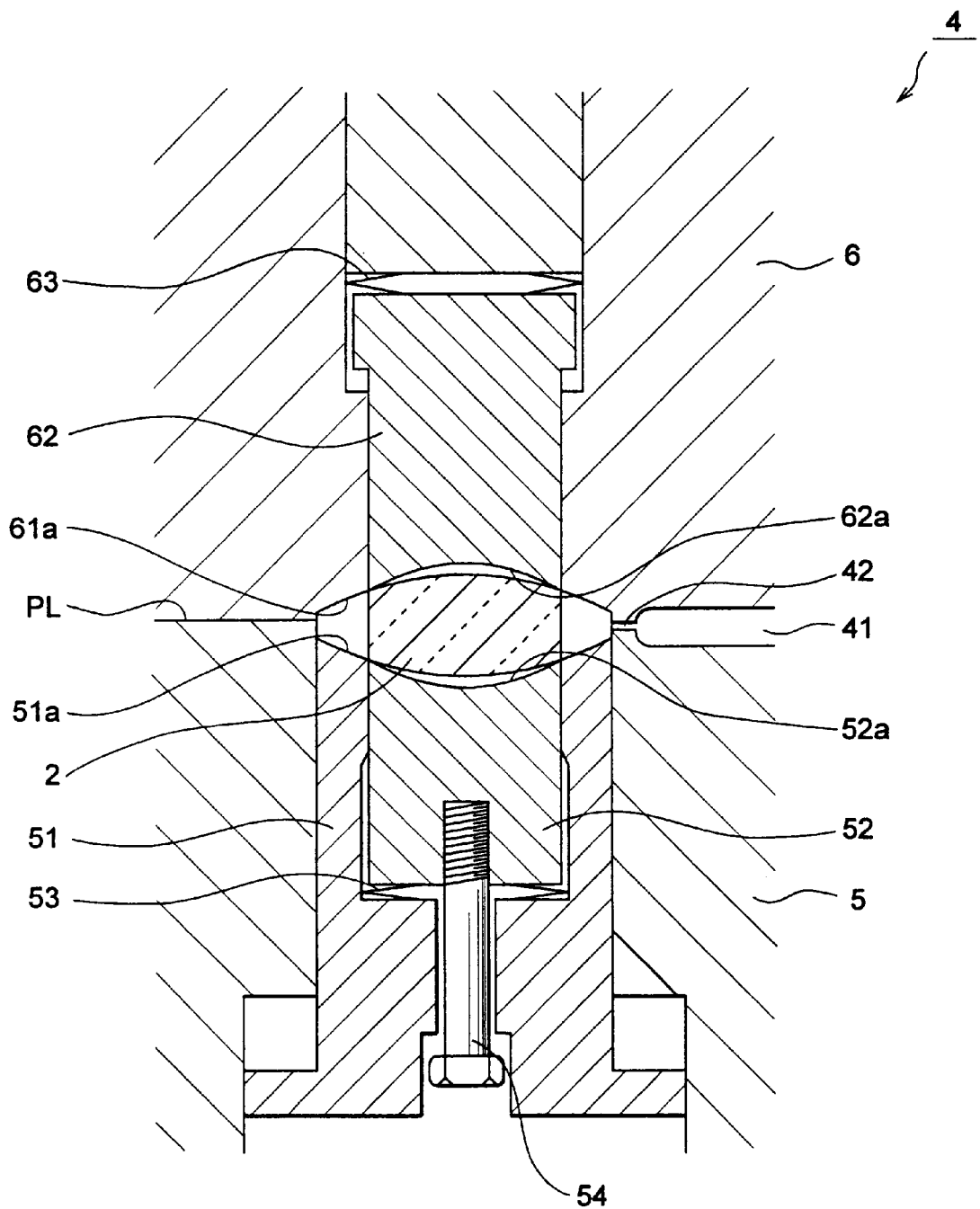
FIG. 2 is an explanatory view of a manufacturing method in accordance with the first embodiment.

FIG. 2 shows the configuration of a mold assembly used for making the multifocal lens 1. Though either of molds indicated by numerals 5 and 6 may be a movable mold in FIG. 2, the case where the mold indicated by numeral 5 is a movable mold will be explained here as an example. As shown in FIG. 2, a mold assembly 4 has such a configuration that the movable mold 5 is adapted to advance and retract with respect to the fixed mold 6 so that the molds can be closed. For example, a movable die plate is configured such that it can be advanced and retracted by a closing mechanism with respect to a fixed die plate, and the fixed mold 6 is attached to the fixed die plate, whereas the movable mold 5 is attached to the movable die plate, thus allowing the movable mold 5 to advance and retract with respect to the fixed mold 6.

As shown in FIG. 2, the movable mold 5 is provided with a core main body 51 which can advance and retract with respect to the fixed mold 6. The core main body 51 is a member defining a molding space (cavity), whose end surface 51a facing the fixed mold 6 has a form identical to that of the optical surface 31 or optical surface 32 of the outer optical portion 3 to be molded. The core main body 51 can be advanced and retracted with respect to the fixed mold 6 by a moving mechanism which is not depicted, thus attaining a retracted state (state where it is moved down in FIG. 2) upon closing the molds, and an advanced state (state where it is moved up such that the end face 51a is positioned higher than the PL (parting line) in FIG. 2) upon opening the molds. In this case, since the multifocal lens 1, which is a molded article, moves to the upper side of the movable mold 5 when the molds are open, the multifocal lens 1 can be easily taken out from the mold assembly 4.

Also, the core main body 51 is provided with an aligning core 52. The aligning core 52 is a member for supporting the central optical portion 2, which becomes an insert member upon molding. The aligning core 52 is attached so as to be slidable with respect to the fixed mold 6 (along the vertical direction in FIG. 2), and is normally urged by a leaf spring 53 toward the fixed mold 6, i.e., upward, while a bolt 54 penetrating through the core main body 51 from thereunder prevents the aligning core 52 from being pulled out from the upper side. The aligning core 52 has an end face 52a which is recessed like a concave mirror, whose radius of curvature is made smaller than that of the optical surface 21 or optical surface 22 of the central optical portion 2.

As shown in FIG. 2, the fixed mold 6 is provided with an aligning core 62. The aligning core 62 is a member for supporting the central optical portion 2, which becomes an insert member upon molding, and is disposed on the same axis as that of the aligning core 52 of the movable mold 5 so as to be slidable with respect to the movable mold 5 (along the vertical direction in FIG. 2). Also, the aligning core 62 is normally urged by a leaf spring 63 toward the movable mold 5. The aligning core 62 has an end face 62a with a center part recessed like a concave mirror, whose radius of curvature is made smaller than that of the optical surface 21 or optical surface 22 of the central optical portion 2.

The surface of the fixed mold 6 facing the movable mold 5 has a molding surface 61a at a position facing the end face 51a. The molding surface 61a is a surface defining a molding space (cavity), which has a form identical to that of the optical surface 31 or optical surface 32 of the outer optical portion 3 to be molded. On the other hand, as shown in FIG. 2, a runner 41, which becomes a path for injecting a resin, is disposed between the movable mold 5 and the fixed mold 6. An end portion of the runner 41 is provided with a gate 42 which becomes a resin-injecting hole.

A method of making the multifocal lens 1 will now be explained.

First, for making the multifocal lens 1, the central optical portion 2, which is a part of the multifocal lens 1, is made. Though the central optical portion 2 can be made similarly to a normal optical lens, it is important that the central optical portion 2 be made of a material at least having a melting point higher than that of the resin material employed for molding the outer optical portion 3.

Subsequently, the thus made central optical portion 2 is set to the center of the cavity within the mold assembly 4. Namely, in an open state where the movable mold 5 is separated from the fixed mold 6, the central optical portion 2 is mounted on the end face 52a of the aligning core 52. Here, since the end face 52a of the aligning core 52 is formed with a radius of curvature smaller than that of optical surface 21 or optical surface 22 of the central optical portion 2, optical surface 21 or optical surface 22 hardly comes into contact with the end face 52a, so as to be securely protected.

Then, the movable mold 5 is moved toward the fixed mold 6, so as to close the mold assembly 4. The movable mold 5 is moved in a state where the core main body 51 of the movable mold 5 has moved down. In this state, as the movable mold 5 moves toward the fixed mold 6, the end face 62a of the aligning core 62 abuts to the central optical portion 2 mounted on the movable mold 5, whereby the central optical portion 2 is held between the aligning core 52 and the aligning core 62. Here, since each of the end face 52a of the aligning core 52 and the end face 62a of the aligning core 62 is formed like a concave mirror having a small radius of curvature, the central optical portion 2 is supported without damaging the optical surfaces 21 and 22, and the optical axis of the central optical portion 2 is oriented to a desired direction (vertical direction in FIG. 2).

When the mold assembly 4 is completely closed as shown in FIG. 2, the central optical portion 2 is disposed between the movable mold 5 and the fixed mold 6, while forming a ring-shaped molding space at the outer peripheral portion of the central optical portion 2. Subsequently, a resin is injected into the molding space by way of the runner 41 and gate 42. The resin injected into the molding space surrounds the outer periphery of the central optical portion 2 and is solidified there so as to adhere thereto, thereby forming the outer optical portion 3. After the resin is solidified, the movable mold 5 is moved away from the fixed mold 6, so that the mold assembly attains an open state. Here, upon moving the movable mold 5 or thereafter, the core main body 51 is moved up, so as to move the multifocal lens 1, which is constituted by the central optical portion 2 and the outer optical portion 3, above the movable mold 5. As a consequence, the multifocal lens 1 can be easily taken out from the mold assembly 4.

Thereafter, when a grinding step is necessary, optical surfaces 21 and 31 and optical surfaces 22 and 32 of the multifocal lens 1 are ground. Here, since optical surfaces 21 and 31 are formed as a continuous surface, they can be simultaneously ground like a typical optical lens. Also, since optical surfaces 22 and 32 are formed as a continuous surface, they can be simultaneously ground like a typical optical lens. Accordingly, though being a multifocal lens with a plurality of focal points, its grinding step can be easily carried out as with a typical optical lens.

As explained in the foregoing, in the multifocal lens 1 and method of making the same in accordance with this embodiment, since the optical surfaces 21 and 22 of the central optical surface 2 are smoothly continuous with the optical surfaces 31 and 32 of the outer optical portion 3, respectively, grinding upon manufacture can be effected in a manner similar to normal optical lenses, whereby it can be manufactured easily. Also, when it is made with the central optical portion 2 and outer optical portion 3 with their refractive indices appropriately changed, a desired optical characteristic can be obtained easily and securely.

This multifocal lens 1 is quite useful as an objective lens of an optical pickup for reading information such as that of CD (compact disc), DVD (digital video disc), LD (laser disc), and the like. In particular, it is useful for a single optical pickup used for CD, DVD, and LD in common.

Further, since the multifocal lens 1 in accordance with this embodiment has the same shape as a conventionally typical optical lens, it is easy to handle.

Second Embodiment

A multifocal lens in accordance with the second embodiment will now be explained.

Figure 3:
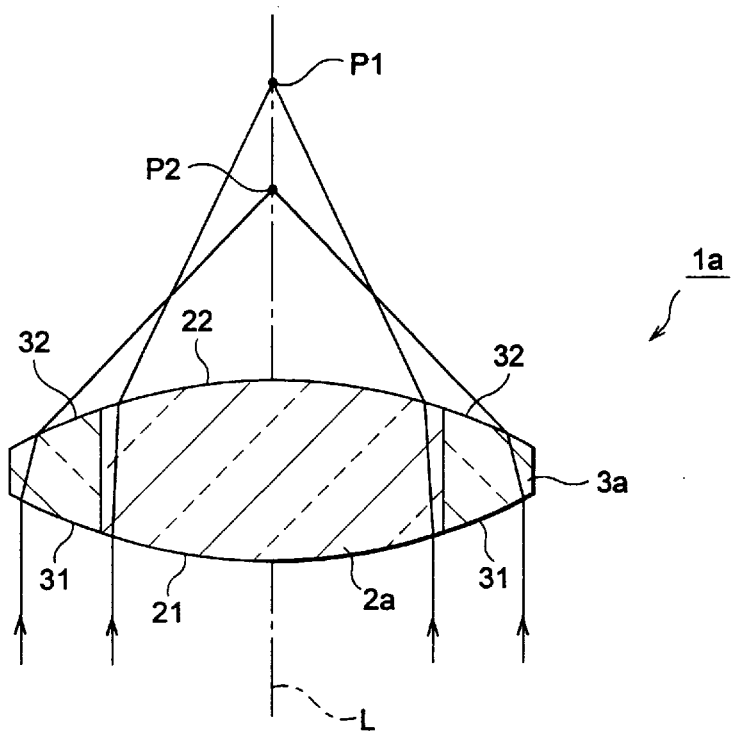
FIG. 3 is a schematic sectional view of a second preferred embodiment of the multifocal lens in accordance with the present invention.

FIG. 3 shows a multifocal lens 1a in accordance with this embodiment. In FIG. 3, the multifocal lens 1a, which is an optical lens having a plurality of focal points with different focal lengths as with the above-mentioned multifocal lens 1, comprises a central optical portion 2a made of a plastic material and an outer optical portion 3a made of a glass material. As in the multifocal lens 1, the optical surfaces 21 and 22 of the central optical portion 2a are smoothly continuous with the optical surfaces 31 and 32 of the outer optical portion 3a, respectively. Also, as in the multifocal lens 1, the central optical portion 2a and the outer optical portion 3a are formed by materials having refractive indices different from each other. In this case, for example, when the refractive index of the outer optical portion 3a is lower than that of the central optical portion 2a, of parallel rays incident on the optical surfaces 21 and 31 of the multifocal lens 1a, those incident on optical surface 21 transmitted through the central optical portion 2a so as to be emitted from the optical surface 22 are converged at a position P2 which is somewhat distanced from the multifocal lens 1a as shown in FIG. 3. On the other hand, of the parallel rays, those incident on optical surface 31 transmitted through the outer optical portion 3a so as to be emitted from optical surface 32 are converged at a position P1 which is farther from the multifocal lens 1 than is the position P2. Thus, when the central optical portion 2a and the outer optical portion 3a are made with refractive indices different from each other, the same light can be converged at positions different from each other. In this case, the light incident on the multifocal lens 1a is not limited to parallel rays. Namely, nonparallel rays can yield similar effects as well.

Further, as the refractive index of the central optical portion 2a or outer optical portion 3a is appropriately altered, without changing the form of the multifocal lens 1a, those having different focal positions P1 and P2 can be made easily.

A mold assembly used for making the multifocal lens 1a will now be explained.

Figure 4:
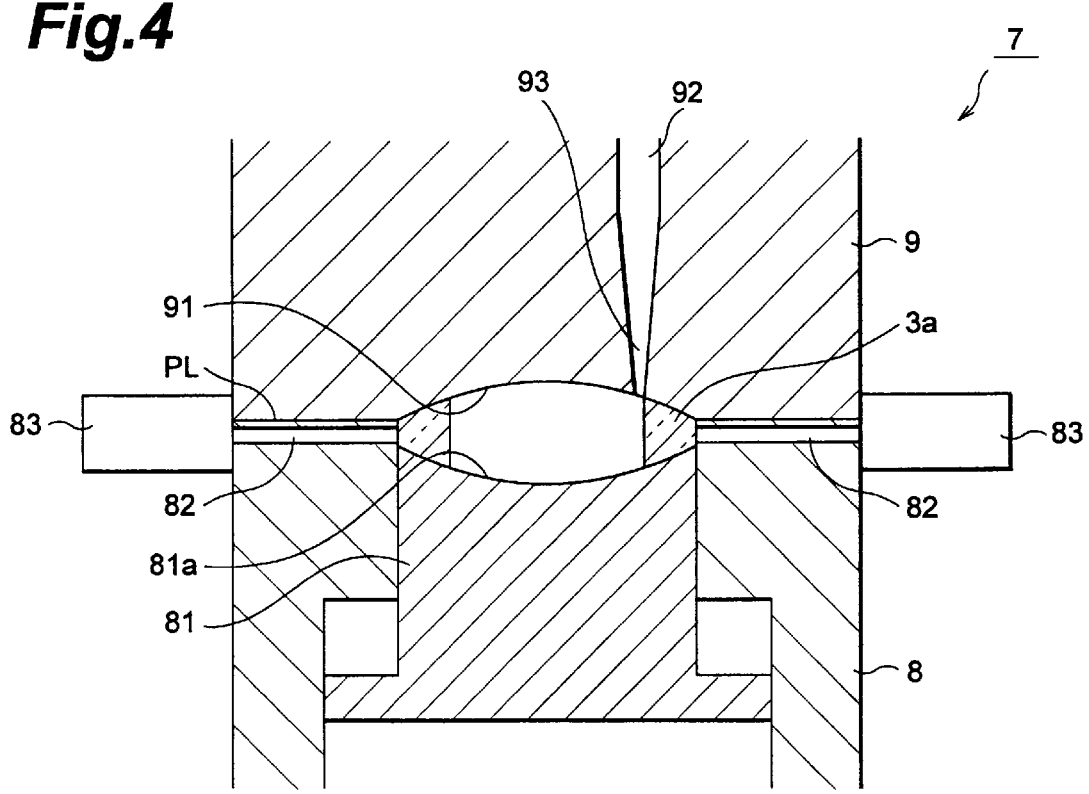
FIG. 4 is an explanatory view of a manufacturing method in accordance with the second embodiment.
Figure 5:
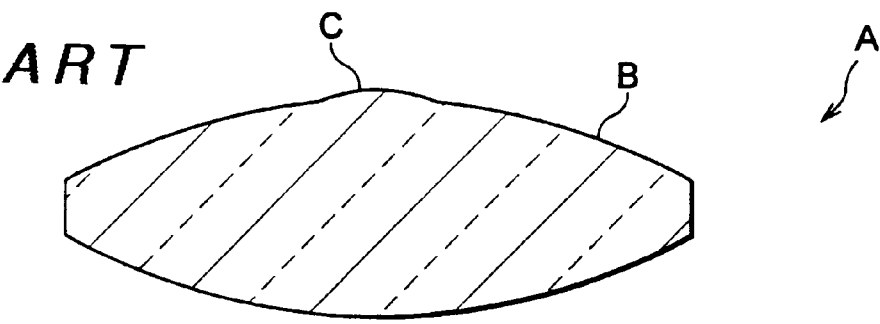
FIGS. 5 to 7 are schematic sectional views of conventional multifocal lenses.
Figure 6:
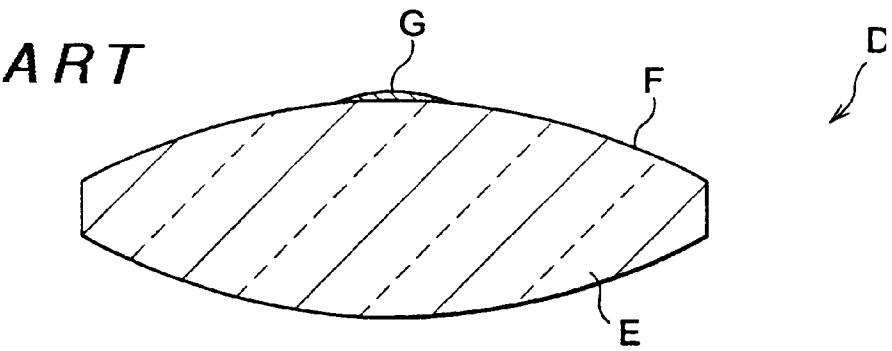
Figure 7:
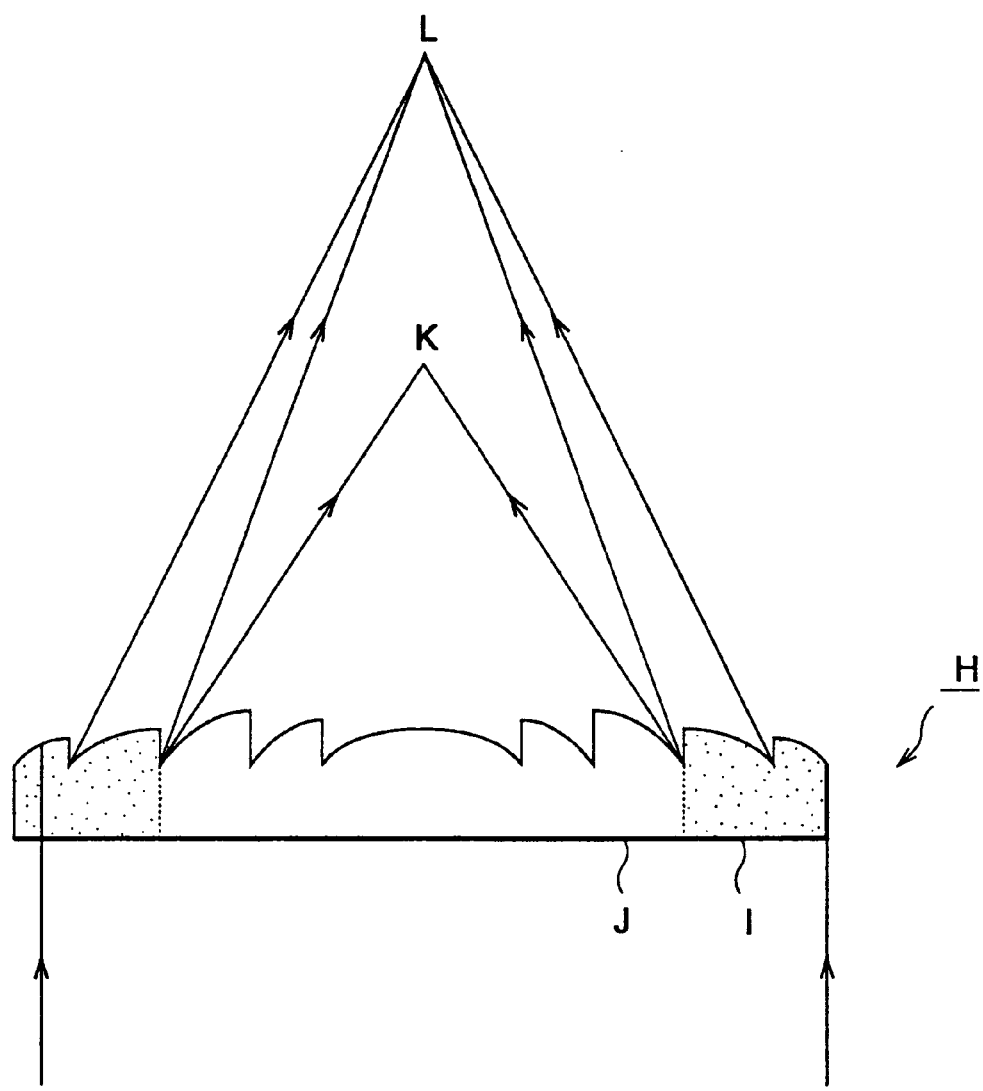

FIG. 4 shows the configuration of a mold assembly used for making the multifocal lens 1a. Though either of molds indicated by numerals 8 and 9 may be a movable mold in FIG. 4, the case where the mold indicated by numeral 8 is a movable mold will be explained here as an example. As shown in FIG. 4, a mold assembly 7 has such a configuration that the movable mold 8 is adapted to advance and retract with respect to the fixed mold 9 so that the molds can be closed. For example, a movable die plate is configured such that it can be advanced and retracted by a closing mechanism with respect to a fixed die plate, and the fixed mold 9 is attached to the fixed die plate, whereas the movable mold 8 is attached to the movable die plate, thus allowing the movable mold 8 to advance and retract with respect to the fixed mold 9.

As shown in FIG. 4, the movable mold 8 is provided with a core 81 which can advance and retract with respect to the fixed mold 9. The core 81 is a member defining a molding space (cavity), whose end surface 81a facing the fixed mold 9 has a form identical to that of the optical surfaces 21 and 31 or optical surfaces 22 and 32 of the multifocal lens 1a to be molded. The core 81 can be advanced and retracted with respect to the fixed mold 6 by a moving mechanism which is not depicted, thus attaining a retracted state (state where it is moved down in FIG. 4) upon closing the molds, and an advanced state (state where it is moved up such that the end face 81a is positioned higher than the PL (parting line) in FIG. 4) upon opening the molds. In this case, since the multifocal lens 1a, which is a molded article, moves to the upper side of the movable mold 8 when the molds are open, the multifocal lens 1a can be easily taken out from the mold assembly 7.

Also, the movable mold 8 is provided with aligning pins 82. The aligning pin 82 is a member for supporting and positioning the outer optical portion 3a, which becomes an insert member upon molding. As shown in FIG. 4, the aligning pin 82 is attached so as to be slidable with respect to the molding space formed between the movable mold 8 and the fixed mold 9 upon closing the mold assembly 7 (along the transverse direction in FIG. 4), thereby positioning the outer optical portion 3a by abutting to the circumferential surface thereof disposed in this molding space. For example, as shown in FIG. 4, a pair of such aligning pins 82 are provided so as to be slidable upon driving an air cylinder 83. Sliding the aligning pins 82 may also be effected by mechanical means using angular pins and the like.

As shown in FIG. 4, the surface of the fixed mold 9 facing the movable mold 8 is formed with a concave portion 91. The concave portion 91 faces the end face 81a of the core 81, thus defining the molding space together with the end face 81a. The inner face of the concave portion 91 has a form identical to the optical surfaces 31 and 21 or optical surfaces 22 and 32 of the multifocal lens 1a. The fixed mold 9 is also provided with a sprue 92 which becomes a path for injecting a resin. Formed at an end portion of the sprue 92 is a gate which becomes a resin-injecting hole. The gate 93 opens to the inner face of the concave portion 91. The gate 93 is a so-called pin gate and is disposed at a position corresponding to the outermost position of the optical surface 21 or 22 of the central optical portion 2a that is resin-molded.

A method of making the multifocal lens 1a will now be explained.

First, for making the multifocal lens 1a, the outer optical portion 3a, which is a part of the multifocal lens 1a, is made. For making the outer optical portion 3a, for example, after an optical lens is formed by a normal manufacturing method, the center portion of the optical lens is bored into a cylindrical form in the direction of the optical axis. Alternatively, the outer optical portion 3a may be made by other manufacturing methods such as glass molding. Here, upon manufacture, it is important that the outer optical portion 3a be formed by a material at least having a melting point higher than that of the resin material employed for molding the central optical portion 2a.

Subsequently, the thus made outer optical portion 3a is set within the mold assembly 7. Namely, in an open state where the movable mold 8 is separated from the fixed mold 9, the outer optical portion 3a is mounted on the end face 81a of the aligning core 81.

Then, the movable mold 8 is moved toward the fixed mold 9, so as to close the mold assembly 7. Namely, as the movable mold 8 moves toward the fixed mold 9, the concave portion 91 abuts the outer optical portion 3a mounted on the movable mold 8, whereby the outer optical portion 3a is held between the core 81 of the movable mold 8 and the fixed mold 9. Also, before or upon moving the movable mold 8, the aligning pins 82 are slid toward the outer periphery of the outer optical portion 3a, whereby the outer optical portion 3a is positioned at a predetermined position within the movable mold 8 by the aligning pins 82.

Then, after the mold assembly 7 is completely closed as shown in FIG. 4, the outer optical portion 3a is disposed between the movable mold 8 and the fixed mold 9, while a molding space is formed at the center part of the outer optical portion 3a. Subsequently, a resin is injected into the molding space by way of the sprue 92 and gate 93. The resin injected into the molding space fills the inside of the outer optical portion 3a and solidifies therein so as to adhere thereto, thus forming the central optical portion 2a. After the resin is solidified, the movable mold 8 is moved away from the fixed mold 9, so that the mold assembly 7 attains an open state. Here, upon moving the movable mold 8 or thereafter, the core 81 is moved up, so as to move the multifocal lens 1a, which is constituted by the central optical portion 2a and the outer optical portion 3a, above the movable mold 8. As a consequence, the multifocal lens 1a can be easily taken out from the mold assembly 7.

Thereafter, when a grinding step is necessary, the optical surfaces 21 and 31 and optical surfaces 22 and 32 of the multifocal lens 1a are ground. Here, since optical surfaces 21 and 31 are formed as a continuous surface, they can be simultaneously ground like a typical optical lens. Also, since optical surfaces 22 and 32 are formed as a continuous surface, they can be simultaneously ground like a typical optical lens. Accordingly, though being a multifocal lens with a plurality of focal points, its grinding step can be easily carried out as with a typical optical lens.

As explained in the foregoing, in the multifocal lens 1a and method of making the same in accordance with this embodiment, since the optical surfaces 21 and 22 of the central optical surface 2a are smoothly continuous with the optical surfaces 31 and 32 of the outer optical portion 3a, respectively, grinding upon manufacture can be effected in a manner similar to normal optical lenses, whereby it can be manufactured easily. Also, when it is made with the central optical portion 2a and outer optical portion 3a with their refractive indices appropriately changed, a desired optical characteristic can be obtained easily and securely.

Third Embodiment

A multifocal lens in accordance with the third embodiment will now be explained.

Though the central optical portion 2, 2a and the outer optical portion 3, 3a are made of materials (glass and plastic) different from each other in each of the multifocal lenses 1 and 1a in accordance with the above-mentioned first and second embodiment, they may also be constituted by the same material as long as the refractive index of the central optical portion 2, 2a and that of the outer optical portion 3, 3a differ from each other. Namely, both of the central optical portion 2, 2a and the outer optical portion 3, 3a may be made of either glass or plastic. Such a multifocal lens can also yield effects similar to those of the multifocal lens 1, 1a in accordance with the first or second embodiment.

Fourth Embodiment

A multifocal lens in accordance with the fourth embodiment will now be explained.

Though each of the multifocal lenses in accordance with the first to third embodiments has two focal points; without being restricted thereto, the multifocal lens in accordance with the present invention may also be a multifocal lens having three or more focal points with different focal lengths yielded by at least two outer optical portions concentrically formed at the outer periphery of the central optical portion. This configuration not only can attain the effects similar to those in the multifocal lenses in accordance with the first to third embodiments, but also is effective in that light can be converged at a number of positions.

Fifth Embodiment

A multifocal lens in accordance with the fifth embodiment will now be explained.

Though each of the multifocal lenses in accordance with the first to fourth embodiments is constituted by a central optical portion and an outer optical portion; without being restricted thereto, the multifocal lens in accordance with the present invention may have a brim (flange) formed outside the outer optical portion as an attachment for attaching the multifocal lens to another member. This configuration not only can attain the effects similar to those in the multifocal lenses in accordance with the first to fourth embodiments, but also is effective in that the multifocal lens can easily be attached to another member by way of the brim.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of making a multifocal lens, the method comprising:

disposing at a center of a mold having a predetermined form a monofocal or multifocal lens having an outer edge at a predetermined radial position from an optical axis; and injecting into the mold a material for an optical member having a refractive index different from that of the lens and solidifying the material so as to form an optical portion like a ring around an outer edge portion of the lens centered at the optical axis of the lens.

2. A method of making a multifocal lens, the method comprising:

disposing within a mold having a predetermined form a monofocal or multifocal lens having a penetrating opening at a center along an optical axis thereof; and injecting into the mold a material for an optical member having a refractive index different from that of the lens and solidifying the material so as to form a circular optical portion within the opening of the lens.

* * * * *